United States Patent [19]

Zackovich

[11] Patent Number: 5,762,465
[45] Date of Patent: Jun. 9, 1998

[54] VEHICLE LIFTING AND TOWING METHOD AND APPARATUS

[76] Inventor: Stanley E. Zackovich, 409 Floral Ave., Cle Elum, Wash. 98922

[21] Appl. No.: 645,652

[22] Filed: May 14, 1996

[51] Int. Cl.⁶ .................................................. B60P 3/12
[52] U.S. Cl. .......................................... 414/563; 280/402
[58] Field of Search ............................ 280/402; 414/563

[56] References Cited

U.S. PATENT DOCUMENTS

| | | | |
|---|---|---|---|
| 2,183,478 | 12/1939 | Holmes et al. | 212/141 |
| 3,182,829 | 5/1965 | Wagner | 214/86 |
| 3,871,535 | 3/1975 | Fenske | 214/86 |
| 3,897,879 | 8/1975 | Bubik | 214/86 |
| 3,924,763 | 12/1975 | Pigeon | 214/86 |
| 4,000,823 | 1/1977 | Aquila | 214/86 |
| 4,034,873 | 7/1977 | Haring | 214/86 |
| 4,186,938 | 2/1980 | Youngblood | 280/402 |
| 4,383,807 | 5/1983 | Bubik | 414/563 |
| 4,384,817 | 5/1983 | Peterson | 414/563 |
| 4,451,193 | 5/1984 | Cannon, Jr. et al. | 414/563 |
| 4,473,237 | 9/1984 | Lind | 280/402 |
| 4,473,334 | 9/1984 | Brown | 414/563 |
| 4,564,207 | 1/1986 | Russ et al. | 280/402 |
| 4,573,857 | 3/1986 | Porter, Sr. et al. | 414/563 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,775,285 | 10/1988 | Zackovich | 414/563 |
| 4,797,057 | 1/1989 | Shoup et al. | 414/563 |
| 4,815,915 | 3/1989 | Crupi, Jr. | 280/402 X |
| 4,836,737 | 6/1989 | Holmes et al. | 414/563 |
| 4,927,315 | 5/1990 | Nespor | 414/563 |
| 4,958,980 | 9/1990 | Holmes et al. | 414/563 |
| 5,271,705 | 12/1993 | Pijanowski | 280/402 |
| 5,350,271 | 9/1994 | Weller | 280/402 X |

FOREIGN PATENT DOCUMENTS

| | | | |
|---|---|---|---|
| 2069809 | 12/1992 | Canada | 280/402 |
| 26 08 523 | 9/1977 | Germany | B60P 3/12 |
| 7707802 | 7/1977 | Sweden | B60P 3/12 |
| 1 501 654 | 7/1975 | United Kingdom | B60P 3/12 |

OTHER PUBLICATIONS

Hawk Wheelift Systems advertisement.
"Cradle Snatcher," Vulcan Equipment Co. Ltd. brochure.
"Super Cradle," Vulcan Equipment Co. Ltd. brochure.
"Brimec Towlift," Wreckers International brochure.
"Wheel Bear Universal Towing Carriage," Dover Corporation, Ernest Holmes Division, brochure.
"Eagle," by American Wheelift Systems, brochure.

(List continued on next page.)

*Primary Examiner*—Dennis H. Pedder
*Attorney, Agent, or Firm*—Stratton Ballew PLLC

[57] ABSTRACT

A vehicle lifting and towing method and apparatus is provided that retains a vehicle's opposing set of wheels for the purpose of lifting and towing the vehicle. The apparatus is especially suited for attachment to a tow truck. The apparatus comprises a transverse beam with two legs, articulatably mounted to a tow vehicle. A pair of carriage arms are each attached at their base ends with manually hinging pivots to one of the legs of the transverse beam. The carriage arms each have a socket. A pair of retaining arms are provided, each manually receivable into the carriage arm's socket. Either end of the retaining arm can be interchangeably inserted into the socket. Also, the retaining arms include an offset segment. The orientation of the offset segment relative to the transverse beam allows various widths of tires to be retained by the carriage assembly. The free ends of the retaining arms are positioned so that they point away from each other and each of the carriage arms are positioned proximate the inside facing interior surface of each of the retained wheels of the vehicle to be towed. The internal wheel lift mechanism includes loops for a wheel strap that secures the retained wheel of the vehicle to be towed, without routing a strap beneath the retained wheel, thus avoiding damage to the strap during transport of the towed vehicle.

9 Claims, 4 Drawing Sheets

OTHER PUBLICATIONS

"Zack–lift," East End Motors, Inc. adverstising brochure.
"Damage Free Towing with a Peterson Scoop," Diversified Products Mfg. Co. brochure.
"Easylift,"Ty–Rite Ltd. brochure.
"Easylift," Ty–Rite Ltd. price list.
"Nielsen Aggregat: LG," parts list.
"Mora Hydraulic Winches," CVE Limited specification sheets.

VEHICLE LIFTING AND TOWING METHOD AND APPARATUS

TECHNICAL FIELD

The invention relates to a method and apparatus for lifting and towing a wheeled vehicle, and more particularly to a lifting and towing method and apparatus for lifting and towing wheeled vehicles, especially suited for attachment to a tow truck.

BACKGROUND OF THE INVENTION

Tow trucks equipped with mechanisms for the recovery and transport of vehicles are well known in the vehicle towing industry. A wide variety of mechanisms have been developed to accomplish the towing of disabled or improperly parked vehicles with some success. One goal of a tow truck's lifting mechanism is to lift an end of a vehicle and enable its transport without damage to the vehicle. The simple, reliable and damage-free towing of a vehicle requires a mechanism thoughtfully engineered to accommodate a wide range of vehicle configurations.

A wheel lift is a category of vehicle lifting mechanisms that has proven to be effective for lifting and towing vehicles. The wheel is a point of potential attachment common to all wheeled vehicles. Wheel lift mechanisms typically attach to the wheels of a vehicle to be towed rather than the frame or undercarriage of the vehicle. The wheel is a desirable point of attachment and support for a vehicle because the vehicle's wheel suspension helps to smoothly transport the vehicle. The wheel is also a strong site for lifting, and similarly configured in most vehicles. Vehicles with contemporary styling often include air dams and ground effect packages that protrude down from the front of the vehicle. Lifting and towing such vehicles without damage to these undercarriage components creates difficulties. Wheel lift mechanisms attempt to overcome these difficulties by avoiding the fragile undercarriage components.

Wheel lift mechanisms can be broadly divided into three categories: gridded wheel lift mechanisms, external wheel lift mechanisms and internal wheel lift mechanisms. Gridded wheel lift mechanisms employ a rectangular frame or wheel cradle. U.S. Pat. No. 4,473,237 to Lind is an example of the gridded wheel lift mechanisms. A primary problem with gridded wheel lift mechanisms, however, is the difficulty in positioning the rectangular frame beneath the wheel of the towed vehicle.

The external wheel lift mechanism typically employs an armature positioned on the outside of the wheel to support one of the wheels of the towed vehicle. The wheel retaining portion of the external wheel lift is open to the interior of the towed vehicle. The external wheel lift mechanism is exemplified in U.S. Pat. No. 4,836,737 to Holmes et al. The Holmes et al. wheel lift tow assembly employs a pair of L-shaped wheel cradles that extend from a transverse bar. The L-shaped bar is positioned against the outside of the wheel, leaving the interior side of the wheel unsupported. The external wheel lift is an improvement over the gridded wheel lift. The lack of framing on the interior of the wheel allows the external wheel lift to easily retain a set of wheels.

However, the external wheel lift mechanism also has undesirable features. In the event a wheel slips through the L-shaped wheel cradle, considerable damage to the towed vehicle results. The absence of support in the interior of the towed vehicle allows the towed vehicle to drop until the L-shaped bar encounters a fender or similar fragile structure which is not designed to support the weight of a vehicle, and is thus easily damaged. Additionally, an external wheel lift mechanism supports the weight of a towed vehicle from the ends of the transverse bar. This requires the transverse bar to be very heavy and unwieldy in order to support a vehicle's weight from the ends of its length.

The internal wheel lift mechanism employs an armature positioned on the inside of the wheel to support one of the wheels of the towed vehicle. As with the external wheel lift mechanisms, the internal wheel lift mechanism is an improvement over the gridded wheel lift. The lack of framing on the interior of the wheel allows the external wheel lift to easily retain a set of wheels. Additionally, the internal wheel lift mechanism has the potential advantage over the external wheel lift by allowing the vehicle to be supported with stronger structure to the interior of the vehicle when a tire slips through the armature or wheel cradle.

Another advantage of internal wheel lifts is that they support the weight of the towed vehicle from near the center of the transverse beam. This enables the transverse beam to be much lighter than a similarly loaded transverse beam used in an external wheel lift mechanism.

The present invention is an improved internal wheel lift mechanism. A shortcoming in current tow truck mounted internal wheel lifting and towing mechanisms is frequent damage incurred to the undercarriages of vehicles during the lifting and towing process. Much of this damage is incurred during the attachment of the internal wheel lift to the vehicle. U.S. Pat. No. 4,564,207 to Russ et al. claims an outwardly directed U-shaped wheel bow that typifies the internal wheel lift. However, the "hydraulic means" employed in U.S. Pat. No. 4,564,207 to Russ et al., to actuate the wheel retaining boom, can result in unwanted damage to the undercarriage of the vehicle as the wheel boom hinges to retain the wheel of the towed vehicle.

Punctured tires frequently result from improperly retaining a wheel. The U.S. Pat. No. 4,473,334 to Brown claims a pair of pivoting claws with prongs that are positioned to lift the wheels of a vehicle. If claws, tines, prongs or armatures are forced into the sidewall of a tire, damage to the tire resulting in a flat frequently occurs, especially when the tire is "tubeless." Therefore, a need exists for an internal wheel lift mechanism that retains the wheels of the towed vehicle without employing a hinging action that potentially levers a claw, prong, boom or armature into the tire sidewall of the wheeled vehicle to be towed.

The operator of an internal wheel lift must retain the wheels of the vehicle to be towed with precision. A problem with existing internal wheel lift mechanisms is that they fail to allow the operator to directly and manually compensate the wheel lift mechanism for the variety of wheel diameters typically encountered. Powered or hydraulic mechanisms often result in damage to the vehicle to be towed. Further, hydraulic or powered mechanisms add to the expense and weight of the wheel lift mechanism. Therefore, a need exists for an internal wheel lift mechanism that allows the operator to manually "fine tune" the wheel lift mechanism for a variety of wheel diameters.

Securing the wheels of the towed vehicle to the wheel lifting mechanism presents additional difficulties. Straps are typically employed to tie down the wheel and securely attach it to the wheel lift for transportation of the vehicle. Often, the strap passes beneath the wheel. Strapping routed beneath the wheel is subject to abrasion from the roadway and obstructions that occasionally contact the underside of the wheel while the vehicle is in transport. These abrasions eventually cause the strapping to sever. If the operator fails to replace the deteriorating strap, the wheel becomes unsecured and can more easily disengage from the carriage assembly. This is an unsafe situation that will damage the towed vehicle and likely damage the tow truck or other vehicles that are following behind. Therefore, a need exists for an internal wheel lift mechanism that employs a wheel strapping system that secures the retained wheel of the vehicle to be towed, without routing a strap beneath the retained wheel.

Tow trucks are typically retrofitted with lift mechanisms. Typically, the lift mechanism of a tow truck includes an extendable boom that can also be raised and lowered. The industry standard includes hydraulic actuation to achieve the required boom articulation. A transverse beam or crossbar mounted to the end of the boom is also a typical feature of tow trucks. The transverse beam is typically pivoted, often hydraulically, to allow the operator to align the transverse beam to the wheels of a vehicle. The customization of a lift mechanism is a difficult task, requiring expert technicians. To simplify the installation and retrofitting of a tow truck with the lift mechanism, the wheel lift mechanism must be compact and also accommodate the frame configuration of the tow truck which includes a boom and a transverse beam.

Prior wheel lift mechanisms fail to provide a configuration that is easily retrofitted to the standard lifting mechanism found in tow trucks. Therefore, a need exists for a lift mechanism that accommodates the boom and transverse bar configuration of a typical tow truck and is especially suited for a retro-fit installation.

SUMMARY OF INVENTION

According to the invention, a method and apparatus for a vehicle lifting mechanism is provided. The mechanism is especially suited for mounting on a tow truck.

The invention comprises a transverse beam with two legs, articulatably mounted to a tow vehicle. A pair of carriage arms are each hingeably attached at their base ends to one of the legs of the transverse beam. The carriage arms each have a distal end, and each distal end includes a socket. A pair of retaining arms are provided, each with a free end and an inserted end. The inserted end is manually receivable into the carriage arm socket.

The vehicle to be towed has a pair of wheels. Each one of the wheels has an interior facing surface. The free ends of the retaining arms are positioned so that they point away from each other and each of the carriage arms are positioned proximate the interior facing surface of each of the wheels of the vehicle to be towed.

According to an aspect of the invention, either end of the retaining arm can be interchangeably inserted into the socket. Also, the retaining arms include an offset segment. The orientation of the offset segment relative to the transverse beam allows various diameters of tires to be retained by the carriage assembly.

According to another aspect of the invention, the hinges on the pair of carriage arms are manually operable pivots. The operator can manually deploy the carriage arms from a stowed position to a deployed position, which is more desirable than powered or hydraulic mechanisms that require frequent maintenance and significantly add to the expense and weight of the wheel lift mechanism.

According to another aspect of the invention, the retaining arm also includes an offset segment. The offset segment is a small segment of the retaining arm which is joined to a main segment along an offset side of the main segment. Alternate distances between the retaining arm and the retaining surface of the outer sleeve of the transverse beam can be selected by the operator to best accommodate the wheel diameter of the vehicle to be towed.

The invention has the additional advantage of retaining the wheels of the towed vehicle without employing a hinging action that damages the wheeled vehicle to be towed.

According to another aspect of the invention, the internal wheel lift mechanism includes loops for a wheel strap that secures the retained wheel of the vehicle to be towed, without routing a strap beneath the retained wheel, thus avoiding damage to the strap during transport of the towed vehicle.

Yet another advantage of the invention is that the lift mechanism is especially suited for a retro-fit installation onto a tow truck.

DETAILED DESCRIPTION OF SPECIFIC EMBODIMENTS

Figure 1:
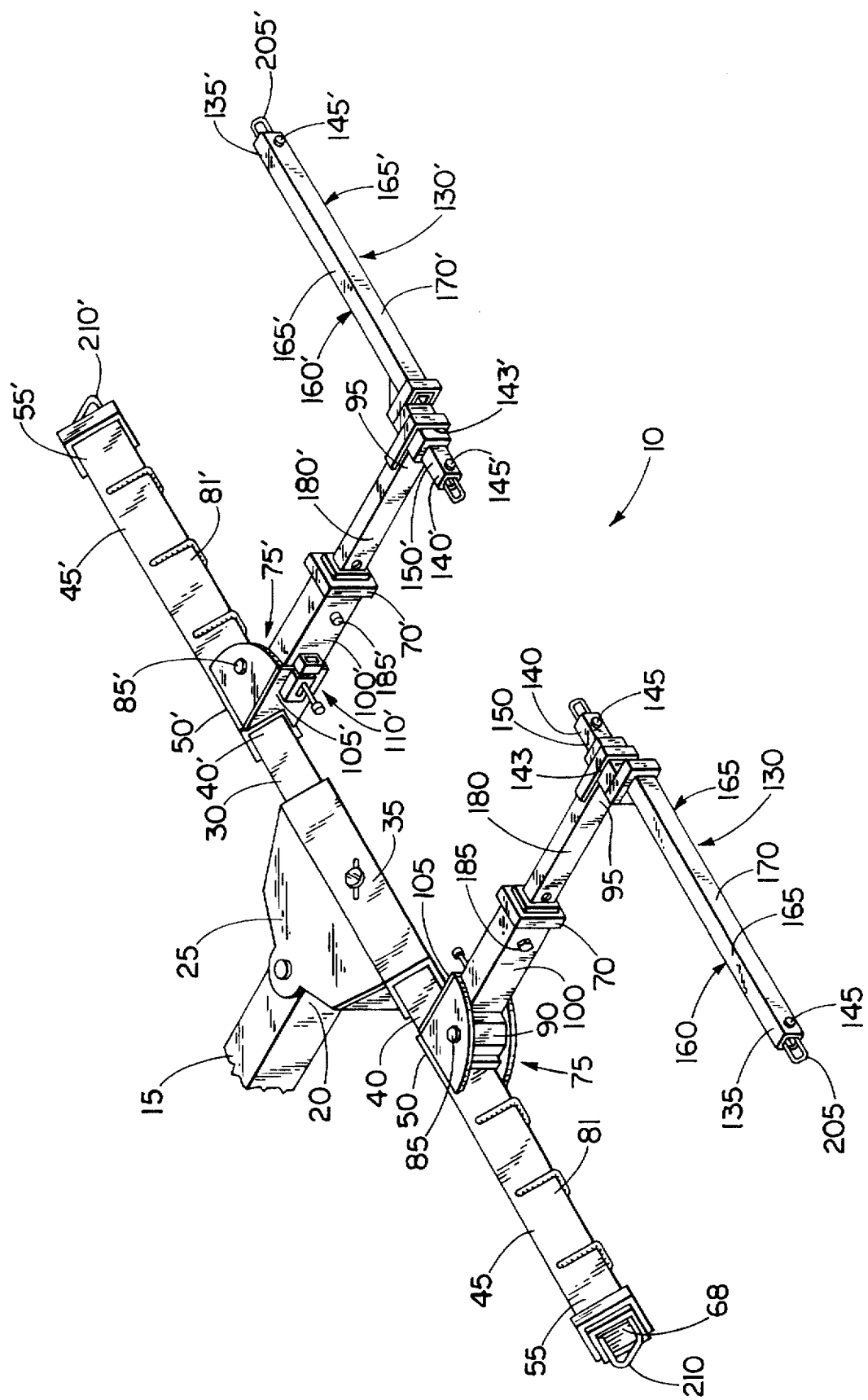
FIG. 1 is a perspective diagram of a vehicle lifting apparatus, according to an embodiment of this invention.
Figure 2:
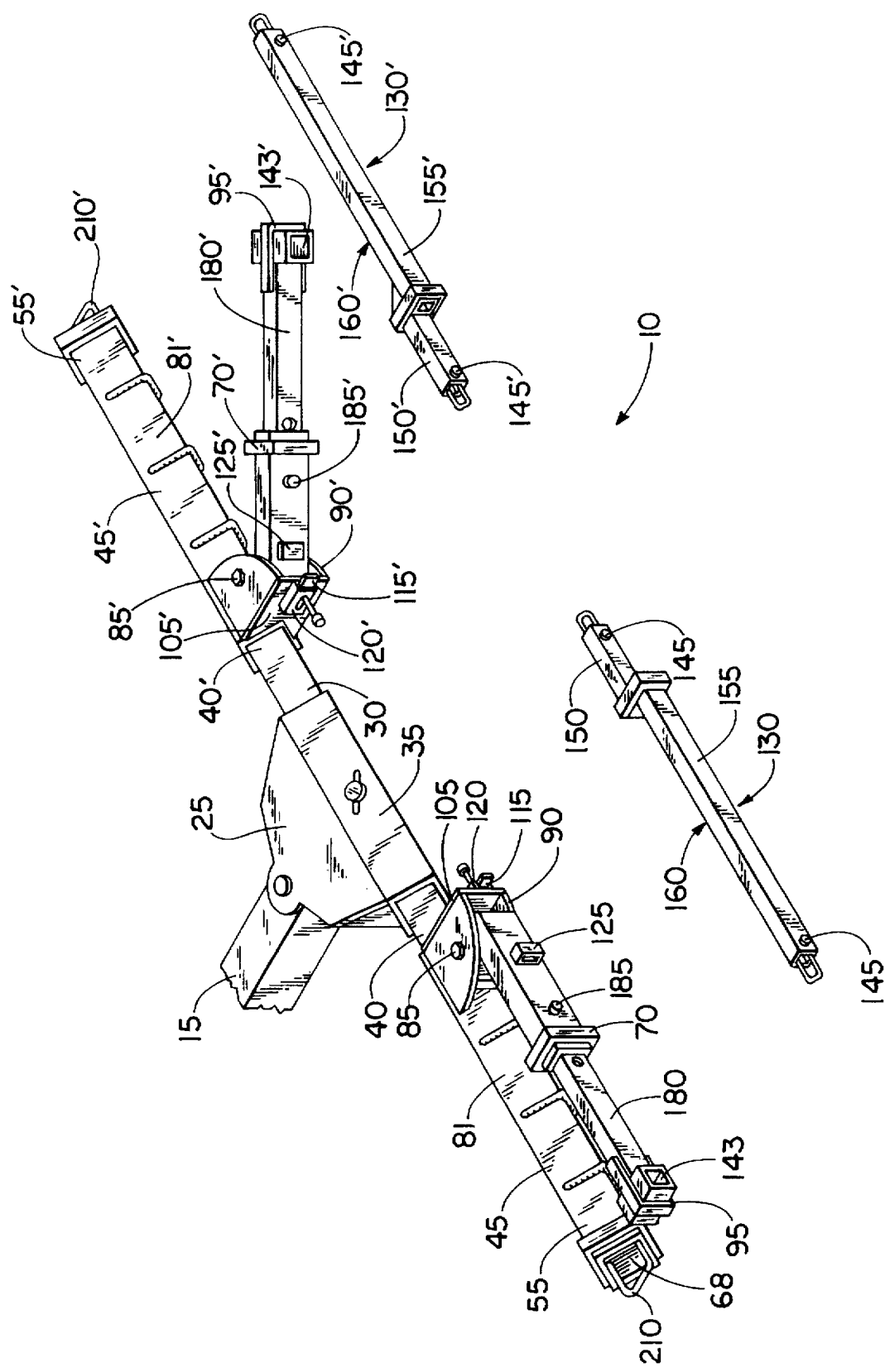
FIG. 2 is a perspective diagram of the vehicle lifting apparatus, according to an embodiment of this invention.
Figure 3:
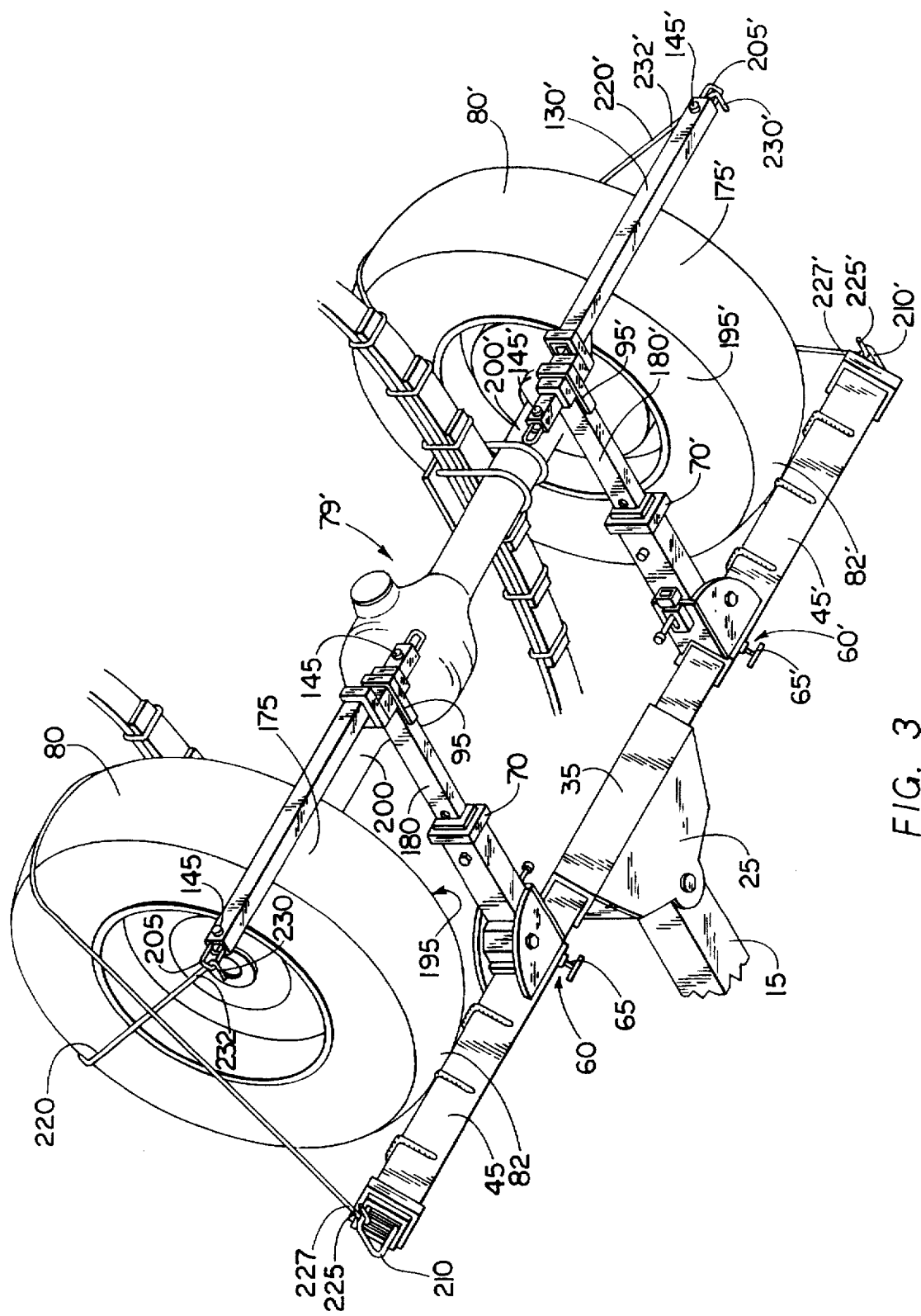
FIG. 3 is a perspective diagram of the vehicle lifting apparatus, according to an embodiment of this invention.

As shown in FIGS. 1, 2 and 3, the invention provides a carriage assembly 10 especially suited for a towing vehicle (not shown) and preferably a tow truck. The tow truck preferably includes a boom 15 extending from the back of the tow truck. The boom can be of many alternative designs known to the towing vehicle industry. The boom has a tail end 20 which typically includes a connection 25 to a transverse beam 30 at an approximate middle point 35 of the transverse beam. The connection to the transverse beam is typically pivoted, to allow the transverse beam to articulate about the tail end of the boom. The transverse beam has a first leg 40 and a second leg 40'.

The carriage assembly 10 is mounted to the transverse beam 30 of the towing vehicle (not shown). The carriage assembly includes a first outer sleeve 45 and a second outer sleeve 45'. The first leg 40 of the transverse beam slidably receives the first outer sleeve. Correspondingly, the second leg 40' of the transverse beam slidably receives the second outer sleeve of the carriage assembly. Alternatively, the first outer sleeve and the second outer sleeve are together referred to as the outer sleeves.

The outer sleeves 45 and 45' each have a base end 50 and 50' and each have a sleeve end 55 and 55'. The slidable outer sleeves surround, and slide transversely on, the smaller diameter transverse beam 30. Preferably the base ends of the outer sleeves are each locked into a position proximate the transverse beam's connection 25 to the tail 20 end of the boom 15.

Also preferably, as shown in FIG. 3, both of the outer sleeves 45 and 45' include a sleeve locking means 60 and 60', to affix and lock each of the outer sleeves to the transverse beam 30. The sleeve locking means prevents the outer sleeves from further sliding on the transverse beam. The sleeve locking means shown includes a threaded bolt 65 and 65' received into a threaded opening (not shown) within each of the outer sleeves. The threaded bolt is manually rotatable and engages the transverse beam when tightened by an operator, locking each of the respective outer sleeves in place along the transverse beam.

A preferred alternate sleeve locking means is also conceived by the inventor. The transverse beam 30 can include a sleeve stop (not shown) on an exterior surface of the transverse beam. The sleeve stop engages a corresponding hole (not shown) in the outer sleeves 45 and 45'. A spring (not shown) within the interior space 68 of the transverse beam maintains pressure on the sleeve stop and prevents the outer sleeve from sliding while the sleeve stop is engaged in the corresponding hole. The operator can manually depress the sleeve stop while pulling or pushing the outer sleeve, thereby sliding the sleeve stop to an adjacent hole in the outer sleeve where the sleeve stop re-engages the outer sleeve, locking the outer sleeve in position.

The carriage assembly 10 also includes a first carriage arm 70 and a second carriage arm 70' that preferably include a hinged connection 75 and 75', to the first outer sleeve 40 and second outer sleeve 45', respectively. The present invention allows the positions of the carriage arms to be transversely adjusted, as described above, relative to the transverse beam 30 within the outer sleeves, to accommodate a wide range of distances between a pair of opposing wheels 80 and 80' (See FIG. 3), and as found in a typical towed vehicle 79 (See FIG. 3). Retaining surfaces 81 and 81' on the outer sleeves retain the front faces 82 and 82', respectively, of the pair of opposing wheels of a towed vehicle.

Most preferably, pivots 75 and 75' as shown in FIGS. 1 and 2, form the hingeable connections. Typically, these pivots each consist of pivot pins 85 and 85', each hingeably received into pivot brackets 90 and 90', respectively. Alternatively, the pivot could be replaced with other known hingeable type connections to serve the same function as the pivot pins and the pivot brackets as described. Additionally, the first carriage arm 70 can alternatively be connected directly to the transverse beam 30 at a position proximate the connection to the boom 25. Likewise, the second carriage arm can be connected directly to the transverse beam at a position proximate the connection to the boom.

Alternatively, the first carriage arm 70 and the second carriage 70' arm are together referred to as carriage arms. The carriage arms each have a distal end 95 and 95' and each have a base end 100 and 100'. Preferably, the base ends of the carriage arms are each attached to an arm base 105 and 105' by the hinged connections 75 and 75', as described above. The carriage arms may be rearwardly extended in a deployed position as shown in FIG. 1 or folded against the corresponding outer sleeve 45 and 45' when the carriage arms are in a stowed position. The first carriage arm 70, as shown in FIG. 2, shows the first carriage arm in a stowed position.

Notably, the carriage arms 70 and 70' of the carriage assembly are manually extended and locked in their deployed position. Conversely, the carriage arms are manually unlocked and folded to their stowed position after a towing operation. Rather than a complex, heavy and expensive mechanical means, such as hydraulic cylinders, gears or chains for accomplishing this function, the carriage arms each articulate around the pivot pin 85 and 85' mounted within the pivot brackets 90 and 90' at the base of the carriage arm. The entire pivot assembly 75 and 75' and each of the arm bases 105 and 105' are positioned rearward of the transverse beam 30. This manual approach to locking and unlocking of the carriage arms is preferred because powered or hydraulic mechanisms often result in damage to the towed vehicle 79 and add to the expense and weight of the carriage assembly.

The carriage arms 70 and 70' are locked in the deployed position, as shown in FIG. 1, with an arm locking means 110 and 110', respectively. Preferably, as shown in FIG. 2, each of the arm locking means includes a slidable element 115 and 115' received within a spring sleeve 120 and 120' that engage an arm sleeve 125 and 125'. Each of the spring sleeves is mounted to the arm base 105 and 105' of the carriage arm. Each of the arm sleeves are mounted to the base end of each carriage arm 70 and 70'. When the slidable element is engaged within the arm sleeve, the carriage arm is locked in the deployed position. When the operator pulls one of the slidable elements toward the transverse beam 30, the arm sleeve engaging the slidable element is disengaged and the carriage arm hosting the arm sleeve is able to pivot on the pivot pin 85 and 85' and rotate toward the stowed position. Preferably, the slidable element is spring loaded to enable it to remain locked when the carriage arm 70' is in the deployed position.

As shown in FIGS. 1, 2, 3 and 4, the carriage assembly 10 of the present invention also features a first retaining arm 130 and a second retaining arm 130' that are releasably and adjustably connected to the carriage arms 70 and 70', respectively. Alternatively, the first retaining arm and the second retaining arm are together referred to as retaining arms. The retaining arms each have a free end 135 and 135' and each have an inserted end 140 and 140'. Preferably, the free end and the inserted end on each of the retaining arms are interchangeable. That is, the free end is able to perform as the inserted end, and the inserted end is able to act as the free end. As shown in FIGS. 1 and 2, each of the carriage arms feature a socket 143 and 143' at the distal ends 95 and 95', respectively, for receiving the retaining arm. Each of the sockets are sized to receive the inserted ends of the retaining arm.

The inserted ends 140 and 140' of the retaining arms 130 and 130' each preferably include an arm stop 145 and 145', respectively. The arm stops prevent each of the retaining arms from being removed, once inserted into the socket 143 and 143' of the carriage arms 70 and 70'. A spring (not shown) within the interior space of the retaining arm maintains pressure on the arm stop. The operator can manually depress one of the arm stops while pulling the attached retaining arm, thereby removing the retaining arm from the socket.

Preferably, each of the retaining arms 130 and 130' include an offset segment 150 and 150'. The offset segments are a small segment of the retaining arm which is joined to a main segment 155 and 155' of the retaining arms along an offset side 160 and 160' of the main segment. When the offset segments include the inserted ends 140 and 140', and the offset sides of the retaining arms face the retaining surfaces 81 and 81' of the outer sleeves 45 and 45', respectively, the distance between the main segment of the retaining arm and the transverse beam 30 is maximized.

More specifically, a maximum distance between each of the retaining arms 130 and 130' and the respective retaining surfaces 81 and 81' can be achieved by manually orienting each of the retaining arms during mounting so that the offset sides 160 and 160' of the main arm segments 155 and 155' face the retaining surface on the outer sleeves 45 and 45' of the transverse beam 30. Alternatively, an intermediate distance between each retaining arm and its respective retaining surface can be achieved by mounting the retaining arm with adjacent sides 165 or 165' of the retaining arm's main segment inserted in the socket 143 or 143' to face the retaining surface. Lastly, a narrowest distance between each retaining arm and its respective retaining surface can be achieved by orienting the opposite side 170 or 170' of the main arm segment facing the respective retaining surface.

Alternatively, a distance between each of the retaining arms 130 and 130' and the respective retaining surfaces 81 and 81', similar to the intermediate distance variation described above, can be achieved by inserting the end of a main arm segment 155 or 155' into the socket 143 or 143'. To this end, the main arm segment abuts the rear face of the wheel 175 or 175'.

Each of the retaining arms 130 and 130' can be coupled to the carriage arms 70 and 70' in multiple configurations that allow a close positioning of the retaining arm relative to the rear face 175 and 175' of the wheel to be retained. Specifically, an operator can choose either end of the retaining arm to roughly position the retaining arm close to the rear wheel surface. Further, the operator can refine the retaining arm position by choosing among four possible orientations of the retaining arm relative to the receiving sockets 143 and 143'.

Preferably, this adjustment of the retaining arms 130 and 130' is a manual adjustment. The fine adjustment of the distance between the retaining arms and the respective retaining surfaces 81 and 81' of the outer sleeve 45 and 45' is critical to properly retain the wheels 80 and 80' of the towed vehicle 79. Powered or hydraulic mechanisms are cumbersome and fail to allow the operator to directly compensate the carriage assembly 10 for the variety of wheel diameters typically encountered.

Additionally, the length of the carriage arms 70 and 70' is preferably adjustable. This adjustment also enables the operator to widen or narrow the distance between the retaining arms 130 and 130' and the respective retaining surfaces 81 and 81' of the outer sleeves 45 and 45'. The carriage arms each include a telescoping portion 180 and 180' that is slidably received into the arm base 105 and 105'. Preferably, set bolts 185 and 185' are inserted through the arm base to engage a penetration (not shown) through the telescoping portion of the carriage arm, locking the telescoping portion in place. This adjustment of the length of the carriage arm is preferably used as a gross adjustment of the distance between the retaining arm and the retaining surface of the outer sleeve. The rotation of the retaining arm, as previously described, is employed as a fine adjustment of this distance.

The carriage assembly 10 is mounted to the transverse beam 30 at the rear of the tow truck (not shown). Tow trucks are typically retrofitted with the carriage assembly. The outer sleeves 45 and 45' are fabricated to slidably fit over the legs 40 and 40' of the tow truck's existing transverse beam. The boom 15, directly attached to the rear of the tow truck, can extend with the attached transverse beam and carriage assembly rearward of the tow truck to position the retaining surface 81 and 81' of the outer sleeves of the transverse beam against the front surface 82 and 82' of the wheels 80 and 80' to be retained. The carriage assembly can contact the ground surface 190, shown in FIG. 4, or be raised to the full upward extension of the boom (not shown).

The boom 15 of the tow truck also retractably articulates at the rear of the tow truck (not shown), allowing the transverse beam 30 and the carriage assembly 10 to be compactly stowed when not in use. After depressing the arm stops 145 and 145' upon the inserted ends 140 and 140' of the retaining arms 130 and 130', and removing the retaining arms, the carriage arms 70 and 70' are pivoted toward the retaining surface 81 and 81' to their stowed position.

In a preferred method of the present invention, a tow truck operator with this carriage assembly 10 attached to the articulatable boom 15 of a tow truck (not shown) can position the tow truck next to wheels 80 and 80' of vehicle 79 to be towed. The operator then lowers the boom downward to the ground surface 190, and manually pivots the carriage arms 70 and 70' from their stowed position, locking them into the deployed position. The operator then checks the alignment of the carriage arms with the wheels 80 and 80' of the vehicle to be towed. The width between the carriage arms is preferably adjusted so that each of the carriage arms is immediately inside of the inside facing interior surfaces 195 and 195' of the wheels of the vehicle to be towed. Preferably, the operator adjusts the width between the carriage arms by depressing the stops (not shown) on the transverse beam 30 and then transversly sliding the outer sleeves 45 and 45'.

The operator then extends the boom 15 toward the vehicle 79 to be towed until the respective retaining surfaces 81 and 81' of the outer sleeve 45 and 45' of the transverse beam 30 contacts the front face 82 and 82' of the wheel 80 and 80' of the vehicle to be towed. Once the retaining arms are inserted into the sockets 143 and 143' of the carriage arm, the operator selects the orientation of the retaining arms 130 and 130' that will provide the minimum distance between the retaining arms and the respective rear faces 175 and 175' of the wheel of the vehicle to be towed. The selected inserted ends 140 and 140' of the retaining arms are placed into the socket where the arm stops 145 and 145' lock the retaining arms into position. The operator can now raise the boom and attached transverse beam with its attached carriage assembly.

The operator raises the carriage assembly 10 to a height that lifts the wheels 80 and 80' of the vehicle 79 to be towed off the ground surface 190 and thereby retains the wheels between the respective retaining surfaces 81 and 81' and the retaining arms 130 and 130'. The carriage arms provide support to the towed vehicle in a similar manner to a typical forklift. In the event that a wheel slips though the space between the retaining arm and the retaining surface on the outer sleeve 45 and 45' of the transverse beam 30, the carriage arms can easily support the structure of the towed vehicle. Typically, the towed vehicle's structure adjacent to the wheels 200 and 200' accommodates the carriage arms very well, thereby minimizing the potential of damage to the towed vehicle.

Figure 4:
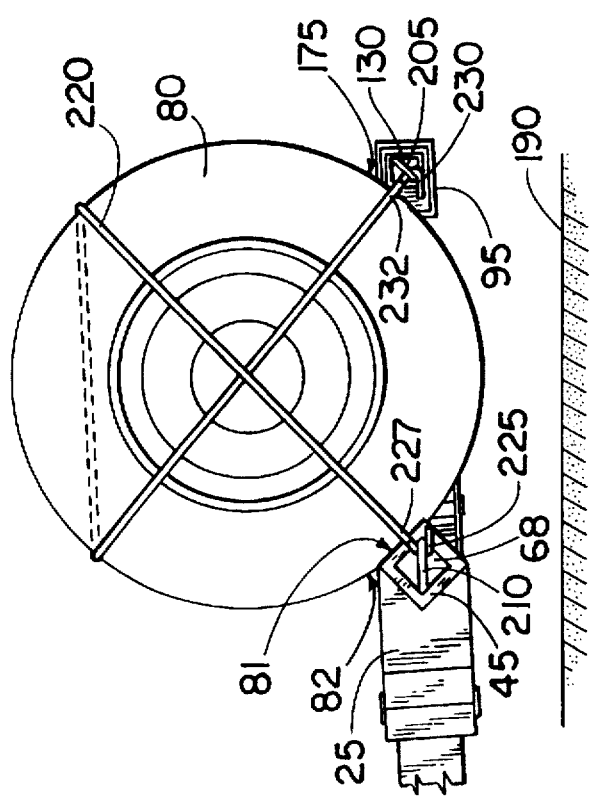
FIG. 4 is a side view of the vehicle lifting apparatus, according to an embodiment of this invention.

Finally, to ensure that the wheels 80 and 80' of the towed vehicle 79 do not disengage in transit, the operator can secure the wheels to the carriage assembly 10. The free ends 135 and 135' of the retaining arms 130 and 130' are each preferably equipped with a free end loop 205 and 205'. Similarly, the sleeve end 55 and 55, of the outer sleeve 45 and 45' is also equipped with a sleeve loop 210 and 210'. A strap 220 and 220' is preferably employed to secure the retained wheels to the carriage assembly 10. The strap can be an elastic or rubber cord as shown in FIGS. 3 and 4, but a woven nylon strap or similar material is most preferred. A first hook 225 and 225' at the first end 227 and 227' of each strap connects the strap to the sleeve loops. A second hook 230 and 230' at the second end 232 and 232' of each strap attaches to the free end loops. Preferably, the straps each include a rachet (not shown) for use with the most preferred nylon straps. The straps are hooked through each of the sleeve loops and then routed in a crisscross fashion over the retained wheel 80 and 80'. The straps are further routed through the inserted end loop and over the retained wheel of the vehicle 79 to the free end loop and then over the retained wheel again to the outer sleeves 45 and 45', respectively. The strap is cinched tightly and the wheel is secure. The loops provided in the carriage assembly enable the strapping to secure the wheel without traveling beneath the wheel.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the foregoing description should not be taken as limiting the scope of the invention which is defined by the claims that follow.

What is claimed is:

1. An apparatus for lifting and towing a wheeled vehicle comprising:

a transverse beam articulatably mounted to a tow vehicle, the transverse beam having a first leg and a second leg;

a first carriage arm having a first base end, the first base end hingeably attached to and manually deployed from said first leg of the transverse beam, the first carriage arm having a first distal end, and the first distal end having a first socket;

a second carriage arm having a second base end, the second base end attached to and manually deployed from said second leg of the transverse beam, the second carriage arm having a second distal end, and the second distal end having a second socket;

a first retaining arm having a first free end and a first inserted end, and the first inserted end receivable into said first socket of the first carriage arm;

a second retaining arm having a second free end and a second inserted end, the second inserted end receivable into said second socket of the second carriage arm, and said first free end away from said second free end; and a vehicle to be towed having a minimum of a first wheel and a second wheel, the first wheel and the second wheel each including an inside facing interior surface, a front face and a rear face, said first carriage arm positioned proximate the inside facing interior surface of said first wheel, said first socket open approximately toward the inside facing interior surface of said first wheel, said front face of the first wheel abutting a retaining surface of said first leg of the transverse beam, said second carriage arm positioned proximate the inside facing interior surface of said second wheel, said second socket open approximately toward the inside facing interior surface of said second wheel, said front face of the second wheel abutting a retaining surface of said second leg of the transverse beam, said rear face of the first wheel abutting said first retaining arm, and said rear face of the second wheel abutting said second retaining arm.

2. The vehicle lifting and towing apparatus of claim 1, wherein the first retaining arm includes an offset, the second retaining arm includes an offset, the first retaining arm being manually removable, manually rotatable and manually reinsertable, and the second retaining arm being manually removable, manually rotatable and manually reinsertable.

3. The vehicle lifting and towing apparatus of claim 1, wherein the first retaining arm has a first offset segment attached to a first main segment, the first offset segment including said first inserted end of the first retaining arm, the retaining arm being manually removable, manually rotatable and manually reinsertable into the first socket to allow for the variation of the distance between the first main segment of the first retaining arm and the retaining surface of the first leg of the transverse beam, the second retaining arm has a second offset segment attached to a second main segment, the second offset segment including said second inserted end of the second retaining arm, the retaining arm being manually removable, manually rotatable and manually reinsertable into the second socket to allow for variation of the distance between the second main segment of the second retaining arm and the retaining surface of the second leg of the transverse beam.

4. The vehicle lifting and towing apparatus of claim 1, wherein the first carriage arm includes a first pivot at the first base end, the first pivot being manually operable, and the second carriage arm includes a second pivot at the second base end, the second pivot being manually operable.

5. The vehicle lifting and towing apparatus of claim 1, wherein the first leg of the transverse beam includes a slidable first outer sleeve, and the second leg of the transverse beam includes a slidable second outer sleeve.

6. The vehicle lifting and towing apparatus of claim 1, wherein said first first leg of the transverse beam has a first sleeve loop, said second leg of the transverse beam has a second sleeve loop, said free end of the first retaining arm has a first free end loop, said free end of the second retaining arm has a second free end loop, a first strap receivable through the first sleeve loop, the first strap receivable through first free end loop, and the first strap placed around said first wheel for securing the first wheel in place, without the first strap routed beneath the first wheel; and a second strap is receivable through the second sleeve loop, the second strap receivable through the second free end loop, and second strap placed around the second wheel for securing the second wheel in place, without the second strap routed beneath the second wheel.

7. A method for lifting and towing a wheeled vehicle which comprises:

a) articulatably mounting a transverse beam to a tow vehicle, the transverse beam having a first leg and a second leg;

b) providing a first carriage arm having a first base end and a first distal end, the first distal end including a first socket;

c) hingeably attaching said first base end of the first carriage arm to said first leg of the transverse beam;

d) manually deploying the first carriage arm from a stowed position to a deployed position;

e) providing a second carriage arm having a second base end and a second distal end, the second distal end including a second socket;

f) hingeably attaching said second base end of the second carriage arm to said second leg of the transverse beam;

g) manually deploying the second carriage arm from a stowed position to a deployed position;

h) providing a first retaining arm having a first free end and a first inserted end;

i) inserting said first inserted end into said first socket of the first carriage arm;

j) providing a second retaining arm having a second free end and a second inserted end;

k) inserting said second inserted end into said second socket of the second carriage arm;

l) positioning said first free end in relation to said second free end so that the first free end is pointed away from the second free end;

m) providing a vehicle to be towed having a minimum of a first wheel and a second wheel, the first wheel and the second wheel each including an inside facing interior surfaces a front face and a rear face;

n) positioning said first carriage arm proximate the inside facing interior surface of said first wheel with said first socket open approximately toward the inside facing interior surface of said first wheel;

o) abutting said front face of the first wheel to a retaining surface of said first leg of the transverse beam;

p) positioning said second carriage arm proximate the inside facing interior surface of said second wheel, with said second socket open approximately toward the inside facing interior surface of said second wheel;

q) abutting said front face of the second wheel to a retaining surface of said second leg of the transverse beam;

r) abutting said rear face of the first wheel to said first retaining arm; and s) abutting said rear face of the second wheel to said second retaining arm.

8. The method of claim 7, with the additional steps of:

t) providing the first retaining arm with an offset;

u) manually removing the first retaining arm;

v) manually rotating the first retaining arm;

w) manually reinserting the first retaining arm to provide an alternate distance between the retaining surface of the first leg of the transverse beam and the retaining arm;

x) providing the second retaining arm with an offset;

y) manually removing the second retaining arm;

z) manually rotating the second retaining arm; and aa) manually reinserting the second retaining arm to provide an alternate distance between the retaining surface of the second leg of the transverse beam and the retaining arm.

9. The method of claim 7, with the additional steps of:

t) providing said first first leg of the transverse beam with a first sleeve loop;

u) providing said second leg of the transverse beam with a second sleeve loop;

v) providing said free end of the first retaining arm with a first free end loop;

w) providing said free end of the second retaining arm with a second free end loop;

x) routing a first strap through the first sleeve loop;

y) placing the first strap around said first wheel;

z) routing the first strap through first free end loop aa) securing the first wheel in place, without routing the first strap beneath the first wheel;

bb) routing a second strap through the second sleeve loop;

cc) placeing the second strap around said second wheel;

dd) routing the second strap through second free end loop; and ee) securing the second wheel in place, without routing the second strap beneath the second wheel.

* * * * *